July 21, 1925.

G. F. VOIGHT

WALL CONSTRUCTION

Filed Jan. 2, 1923

Inventor -
George F. Voight

July 21, 1925.
G. F. VOIGHT
WALL CONSTRUCTION
Filed Jan. 2, 1923
1,546,522
2 Sheets-Sheet 2
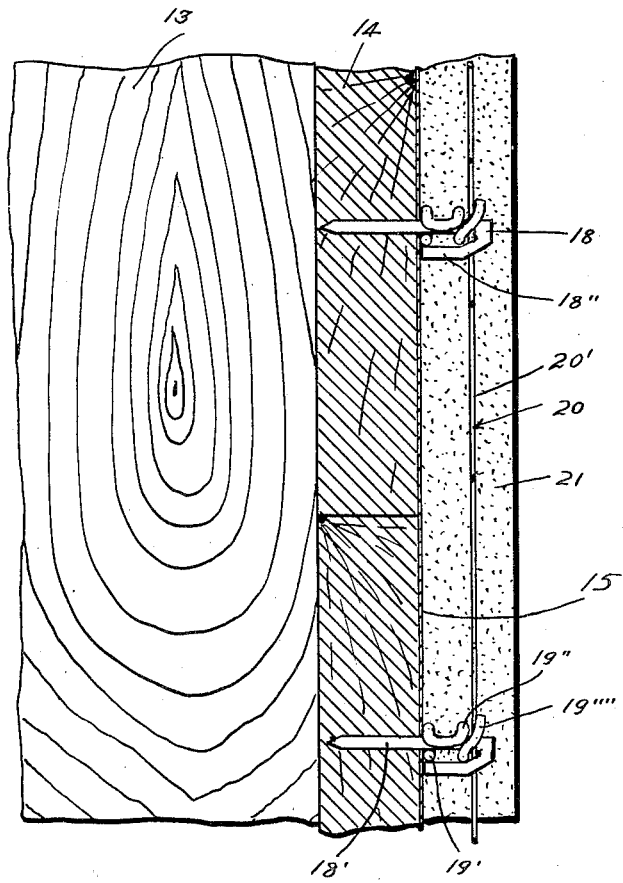
Fig.2.
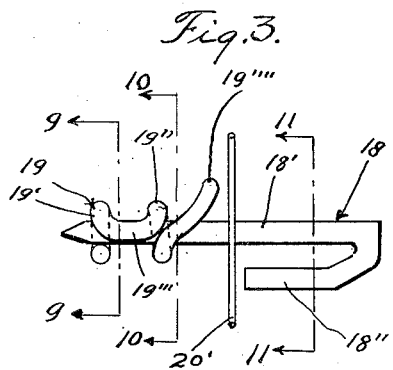
Fig.3.
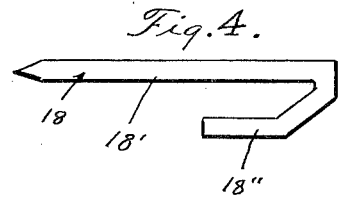
Fig.4.
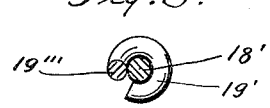
Fig.5.
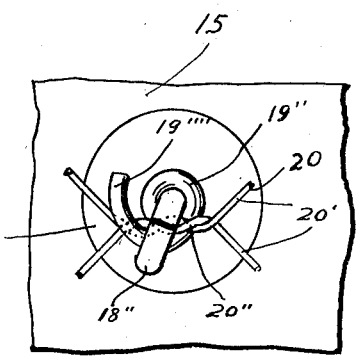
Fig.8.
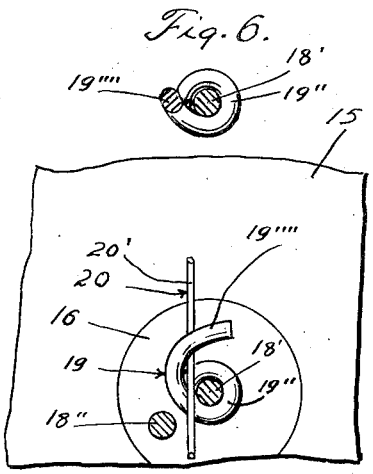
Fig.6.
Fig.7.
Inventor —
George F. Voight Patented July 21, 1925.

1,546,522

UNITED STATES PATENT OFFICE.

GEORGE F. VOIGHT, OF OAKLAND, CALIFORNIA.

WALL CONSTRUCTION.

Application filed January 2, 1923. Serial No. 610,297.

*To all whom it may concern:*

Be it known that I, GEORGE F. VOIGHT, a citizen of the United States, residing at Oakland, in the county of Alameda and State of California, have invented new and useful Improvements in Wall Constructions, of which the following is a specification.

My invention relates to improvements in wall constructions of buildings, particularly to the exterior walls of frame buildings, and embodies a structure comprising a siding of boards secured to the outer sides of the studding and frame timbers of the wall, the siding provided with an exterior sheathing of builders' paper, over which is spread a coating of cement reinforced by a wire grill.

One of the objects of the present invention is the provision of grill brackets interposed between the grill and paper, for securing the grill at a distance outwardly therefrom, thereby permitting of proper embedment of the grill in the cement when the latter is applied to the wall.

With the foregoing and still further objects and purposes in view which will appear as the description proceeds, my invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings—

Figure 2 is a cross section through a portion of the wall, showing also the cement coating as applied thereto;

Figure 3 is a view in elevation of one of the grill brackets and a fragment of wire forming a portion of the grill;

Figure 4 is a side elevation of a nail or fastening element forming a portion of the bracket;

Figure 5 is a cross section on line 9—9 Fig. 3;

Figure 6 is a view in cross section on line 10—10, Fig. 3;

Figure 7 is a sectional view on line 11—11, Fig. 3, showing a portion of one of the grill wires in its permanent position on the bracket, showing also a section of the builders' paper; and Figure 8 is an end or plan view of one of the brackets and a section of the grill secured thereto, the view showing also a section of the builders' paper.

Referring to the drawings in detail, throughout which like reference characters designate like parts—

Figure 1:
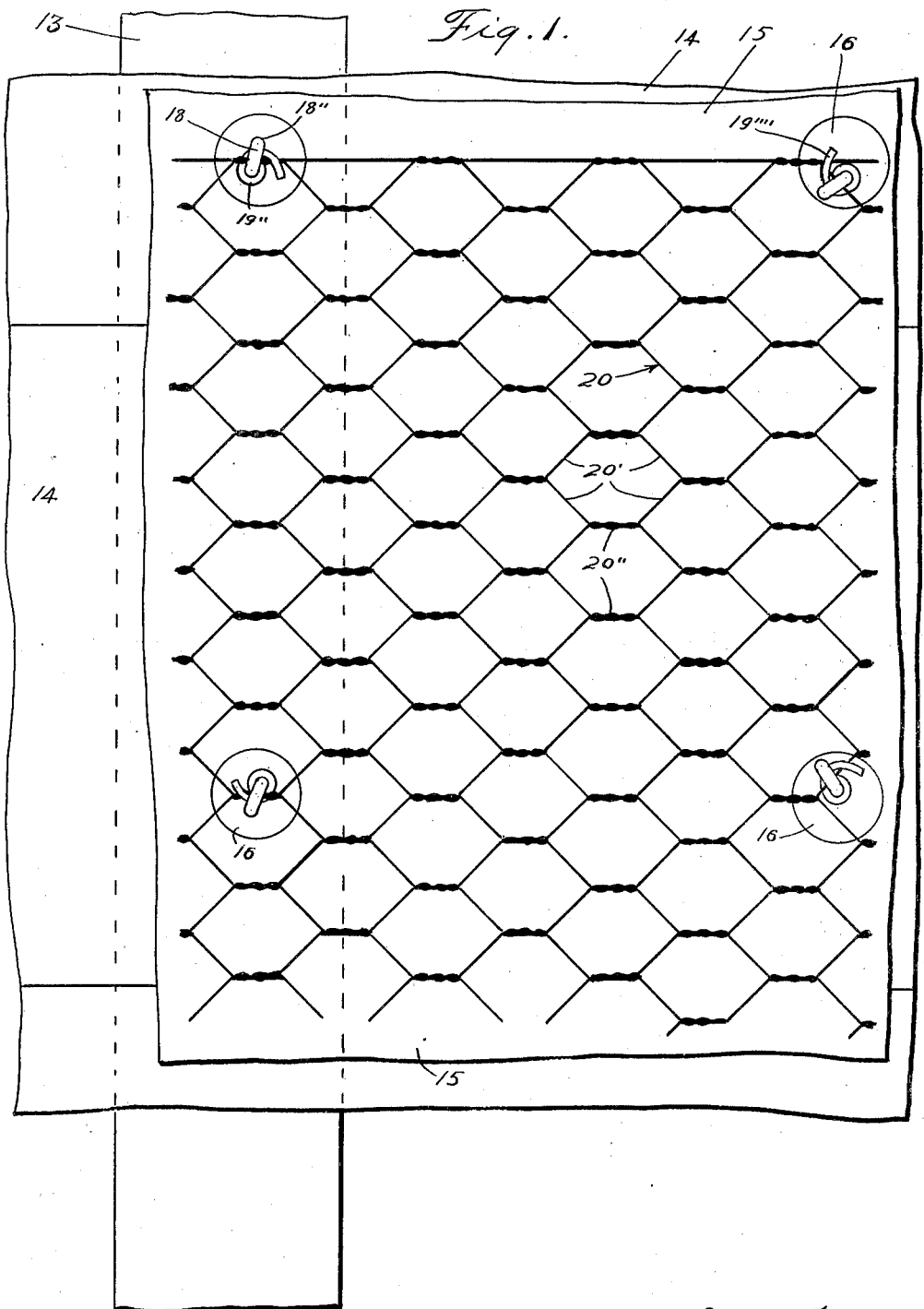
Figure 1 is a side elevation of a fragmental portion of the wall of a frame building constructed in accordance with my invention, the cement finish not being shown.

The numeral 13 designates one of the studs forming a portion of the frame timbers or skeleton of the wall of a frame building. To the exterior of which timbers are secured wall boards 14, which should, preferably, be of uniform thickness and laid in close edge-wise relation, so as to form, as nearly as practicable, an exterior wall siding having a substantially smooth outer surface.

Against the exterior of the siding boards 14 is disposed a sheathing of builders' paper 15, which may, if preferred, have printed upon one side indicators 16, the objects of which will be hereinafter fully explained.

18 designates grill brackets comprising, each, a driven member or shank 18' formed at its upper end with a downwardly projecting side arm 18", and a grill spacing element 19, the latter comprising a piece of wire bent to form a lower loop 19' encircling the lower or forward end of the driven member 18', an upper loop 19" encircling said driven member above the loop 19', an intermediate section 19''' connecting said loops together, and an extension 19''''.

The extension 19'''' describes, in general, an involute spiral or curve of which the periphery of the driven member 18' forms the evolute, the spiral advancing towards the upper end of the driven member while moving away from the axis thereof.

The spacing element 19 is intended to be disposed initially on the lower or forward end of the driven member 18' (see Fig. 3.) and to embrace this member snugly and with sufficient contractile tension so as to prevent any accidental movement thereof relative to said driven member, but longitudinally slidable along on the latter when the same is operatively driven into its support.

The initial position of the spacing element 19 on the lower end of the driven member 18′, as well as its final position on the upper end thereof after the bracket has been applied to the wall boards, is clearly illustrated in Figs. 4 and 3, respectively.

The free end of the side arm 18″ is preferably cut off at right angles with the axis of the shank member 18′, thereby providing a flat face for the free end of the arm, which is engageable with the support into which the shank may be driven for providing the latter with certain resistance against further forward movement after it has penetrated the support a proper distance.

In applying the bracket for securing the grill to the wall, it is preferable to project the forward end of the bracket, including the extension 19′′′′, through from the outer side of one of the meshes of the grill (see Fig. 3), and then manipulate the bracket so as to bring the extension out through the adjoining mesh, then by giving the bracket a slight clock-wise turn the extension is moved forwardly until its free end projects over, and its intermediate portion engages, the dividing wire of said two meshes (see Figs. 7 and 8.). The bracket is next engaged with the siding boards 14 and the shank 18′ driven forwardly, causing it to slide through the spacing element 19 and to penetrate the boards until the upper end of the side arm 18″ engages the wire 20′ and forces it down on the extension 19′′′′ adjacent its union with the loop 19″, and the spacing element 19 to seat against the face of said boards. The length of the side arm 18″ being intended to be such that, when the shank 18′ is driven home to cause the spacing element to properly seat against the face of the boards 14, its free end will engage the latter and thereby assist the spacing element in arresting further penetration of the driven member thereinto (see Fig. 2.).

The spacing element 19 is intended to hold the grill a predetermined distance away from the siding boards 14, and the side arm 18″ and extension 10′′′′ are intended to hold the grill on the upper end of the spacing element.

In impinging the head of the driven member 18′ for driving it into its support, it is preferable that the final blows directed thereon be directed to also impinge the extension 19′′′′ and bend it downwardly to insure proper engagement of this member with the outer side of the grill.

It is to be understood that the application of my invention to the wall of a building is not dependent upon the employment of the builders' paper 15, and that, if so desired, the latter may be entirely eliminated and the brackets secured directly to the woodwork of the wall, the latter, in case of such elimination of paper, providing the back ground for the plastic composition.

I claim:—

1. In combination, a driven element comprising a shank member having its upper end formed into a hook, and a spacing element comprising a length of wire bent to form a U-shaped loop portion disposed in a plane parallel with the axis of said shank member and with one of its side limbs disposed above the other side limb thereof, one end of the lower side limb terminating in a loop through which projects said shank member, the free end of the upper side limb terminating in an extension, said extension adapted to support a grill wire, said hook adapted to engage said grill wire for holding it on said extension along one side of said shank member.

2. In means of the character described, a spacing element comprising a length of wire bent to form a loop adapted to seat against a support, one of the ends of said loop terminating in a U-shaped loop disposed in a plane approximately at right angles with said first named loop, the free end of said U-shaped loop terminating in means adapted to support a wire grill.

3. In means of the character described, a spacing element comprising, a single length of wire bent to form a lower member adapted to seat against a support, said lower member supporting an intermediate U-shaped member, said U-shaped member terminating upwardly in means adapted to support a wire grill.

4. In means of the character described, a spacing element comprising a length of wire bent to form a loop adapted to seat against a support, one of the ends of said loop terminating in a U-shaped loop disposed in a plane approximately at right angles with the face of said support, the free end of said U-shaped loop supporting an extension.

5. In means of the character described, a grill bracket comprising, a spacing element embodying a length of wire bent to form a lower member adapted to seat against a support, said lower member supporting an intermediate U-shaped member, said U-shaped member terminating upwardly in means adapted to support a wire grill, and a driven element projecting through said lower member, said driven element having a projection at its upper end adapted to engage and hold said wire grill on said means, said U-shaped member disposed along side of said driven element.

6. In means of the character described, a grill bracket comprising, a spacing element comprising a length of wire bent to form a lower member in the form of a loop adapted to seat against a support, said lower member supporting an intermediate member in the form of a U-shaped loop, the latter terminating upwardly in means adapted to support a wire grill, and a driven element having a shank member projecting through said lower member along side said U-shaped member, the free end of said means projecting a distance outwardly from said shank member and being un-supported.

In testimony of the foregoing being my own, I have hereunto affixed my signature this 19th day of December, 1922.

GEORGE F. VOIGHT.